United States Patent

Hendley

[15] 3,673,977
[45] July 4, 1972

[54] AUTOMATIC STEERING SYSTEMS

[72] Inventor: Dennis Alfred Hendley, London, England
[73] Assignee: Decca Limited, London, England
[22] Filed: Oct. 19, 1970
[21] Appl. No.: 81,669

[52] U.S. Cl. ............................................114/144, 318/589
[51] Int. Cl. ...........................................................B63h 25/04
[58] Field of Search .................114/144; 318/589, 588, 640

[56] References Cited

UNITED STATES PATENTS 3,140,436  7/1964  Hatch .................................114/144 X
2,841,754  7/1958  Jones ..................................114/144 X

*Primary Examiner*—Andrew H. Farrell
*Attorney*—Mawhinney & Mawhinney

[57] ABSTRACT

A steering system for a seagoing vessel includes a motor which drives a rudder in accord with a command signal formed by combining a steering signal and a feedback signal representing an integration of the driving movements of the motor. The feedback signal is held in a capacitor which is associated with a leakage resistor so that the feedback signal automatically decreases independently of the movements of the rudder. The system permits a rapid response of the system for ordinary maneuvers and long term compensation for the effects of asymmetric loads or strong tides.

3 Claims, 1 Drawing Figure

PATENTED JUL 4 1972 3,673,977
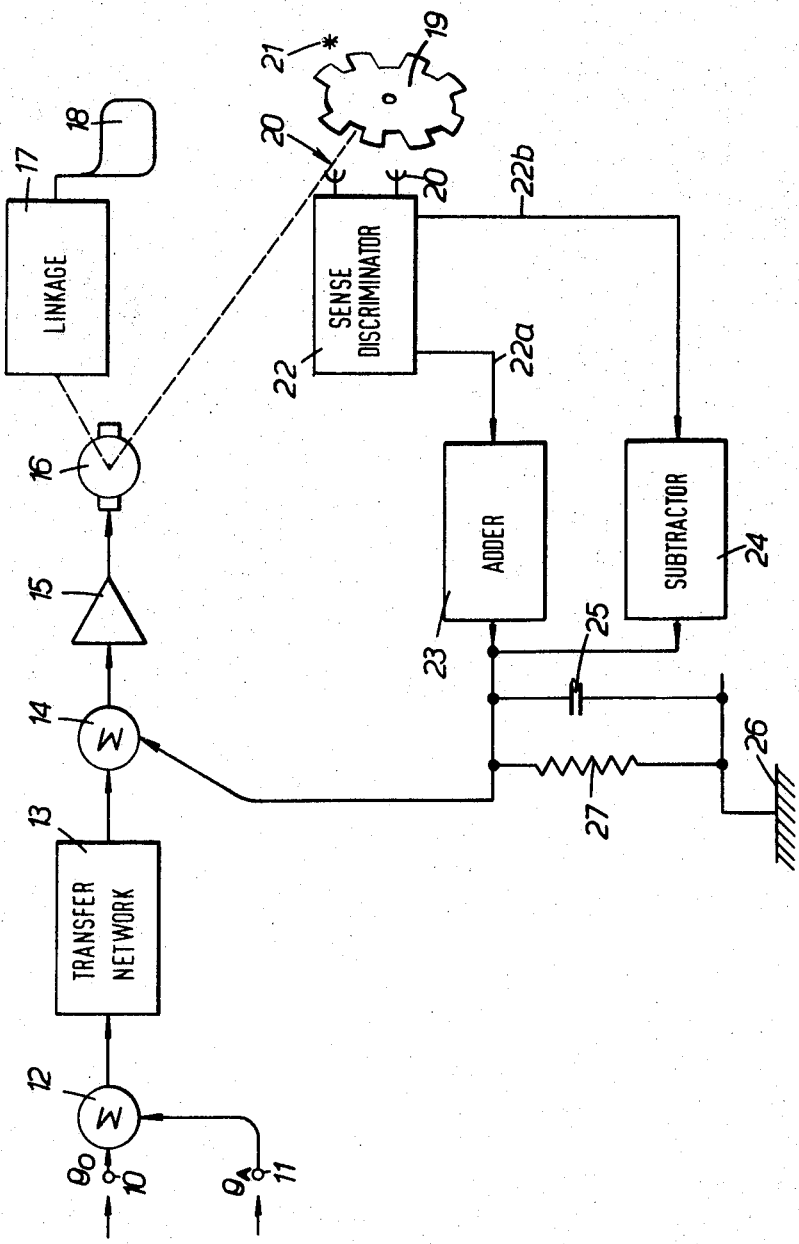

AUTOMATIC STEERING SYSTEMS

BACKGROUND TO THE INVENTION

This invention relates to steering systems for seagoing vessels and is particularly concerned with automatic steering systems or auto-pilots.

In automatic steering systems a steering signal, normally derived by comparing a desired course with an actual course, is used to obtain a command signal. Means such as an electric motor is used for driving through an appropriate linkage a rudder or its equivalent. It has been the practice to employ positional feedback by obtaining from, for example, a potentiometer driven by the rudder or other steering device, a signal representing the actual 'rudder angle' and combining this latter signal with the steering signal to form the command signal. It is desirable to provide this type of feedback to avoid positional error in the rudder angle due to the finite time delays of the overall control system.

The present invention is particularly concerned with certain related steering problems arising from the effect of external forces acting on the vessel. For example, if a trawler is pulling a trawl net, which is usually an asymmetric load, a turning moment is exerted on the trawler. This can be compensated by maintaining the rudder angle in or about a mean position which is different from that required to steer the vessel on a similar course in the absence of the net. Similar compensation is often required in strong tides or conditions other than a calm sea. However, with the usual position feedback this compensation cannot readily be provided.

SUMMARY OF THE INVENTION

According to the invention, in a steering system having means for driving a steering device in accord with a command signal derived from a steering signal there are provided means for obtaining a signal representative of an integration of the command signal, means for combining the representative signal with the steering signal to form the command signal and means independent of the steering device for reducing the magnitude or significance of the representative signal with time, preferably to a zero or like insignificant value.

With the present invention, over a relatively long period the positional feedback can be nullified: this enables the system to maintain the rudder angle of the steering device such as to compensate for the aforementioned types of conditions, which are normally long term effects that vary very slowly. However, short term variations in the rudder angle such as are necessary for normal maneuvers are still assisted by positional feedback: the impressed rate of change of the representative signal must be determined accordingly.

It is convenient to provide a store for the representative signal and means coupled to the store for reducing the (stored) representative signal. One particularly convenient arrangement is to constitute the representative signal as a voltage and to provide a capacitor for the store: in this arrangement a leakage resistor may be associated with the capacitor to provide the desired reduction of the stored signal.

It is also convenient to make the means for obtaining the representative signal independent of the steering device. This avoids problems due to 'back-lash' in any linkage between the means for driving and the steering device itself and in effect provides positional feedback from a 'phantom rudder' moving perfectly in response to the command signal. Accordingly, where, as would be usual, the means for driving includes an electric motor, means may be responsive to the movement of the motor in response to the command signal for obtaining the representative signal.

BRIEF DESCRIPTION OF THE DRAWING

The drawing illustrates in schematic form a preferred embodiment of the invention.

DESCRIPTION OF THE PREFERRED EMBODIMENT

The embodiment in the drawing is an automatic steering system. A signal $\theta_0$ representing a desired course is received at an input terminal 10. A further signal $\theta_A$ denoting the actual course of the ship and obtained from a compass (not shown) is received at a terminal 11. The two input signals are algebraically combined in a summing network 12 to form a primary steering signal. The output of the summing network 12 is fed to a transfer network 13 which modifies the primary steering signal in accord with the steering characteristic of the vessel. In general, the transfer network will in known manner introduce non-linearity into the primary steering signal in order to take into account non-linearity in the response of the ship to a change in the position of its rudder. The transfer network 13 is optional and in a relatively simple system would be omitted.

The output of the transfer network 13 namely a modified steering signal is fed to one input of a summing junction 14. There it is combined with a further signal obtained in a manner to be described hereinafter. The output of the summing junction 14 constitutes a command signal. The command signal is amplified by a power amplifier 15 and an amplified version of the command signal energizes an electric motor 16 which is coupled through a linkage 17 to a rudder 18.

For deriving an integration of the command signal there is provided a tachometer disc 19 linked to the armature of the motor 16. Associated with the tachometer disc 19 are two optical sensors 20 illuminated through cut-away portions of the disc 19 by a light source 21. The two sensors 20 are arranged to be 90 electrical degrees apart, taking into consideration the number of cycles of variation that the tachometer can provide per single revolution. The signals picked up by the sensors comprise two square wave signals in quadrature. These signals are fed to a sense discriminator 22 which in known manner provides on a first output line 22a pulses each representing an increment of movement of the tachometer disc in one direction and on a line 22b pulses each representing an increment of movement of the tachometer disc in the reverse direction.

The pulses on the line 22a are fed to an adder 23 which on receipt of a pulse provides a corresponding increase of charge on a capacitor 25. On receipt of a pulse on the line 22b, a subtractor 24 decreases the charge on the capacitor 25 by a corresponding increment. Accordingly, the voltage across the capacitor is a signal which represents an integration of the movement of the motor and hence an integration of the command signal obtained from the output of the summing junction 14.

One end of the capacitor 25 is coupled to a ground line 26 whereas the other end is coupled to the second input of the summing junction 14 to complete a positional feedback loop.

In this particular embodiment of the invention the integrated signal stored in the capacitor 25 is to be reduced slowly with time, independently of any movement of the motor 16 or the rudder 18, in order that the rudder 18 can be moved to a position which compensates for external forces producing a turning movement on the ship or to counter other external conditions which cannot otherwise be taken into account by the automatic steering system. For this purpose the voltage across the capacitor must be reduced, whatever its sense. Although a variety of means could be provided for this purpose it is simple and convenient to provide a leakage resistor 27 across the capacitor so that the signal stored by the capacitor falls exponentially with time.

If the system is automatic only in so far as the rudder is moved with the aid of position feedback automatically in accord with the steering signal and is not part of an auto-pilot then, as will be readily apparent, the comparison of signals representing desired and actual courses is inappropriate and the means therefor would be omitted.

I claim:

1. A steering system comprising a steering device, means for providing a steering signal, a motor for driving the steering device in accord with a command signal derived from the steering signal, a store comprising a capacitor associated with a leakage resistor, a tachometer disc coupled to the motor, sensing means responsive to the movement of the disc to provide first pulses each representative of an increment of the movement in one sense and further pulses representative of an increment of the movement in a reverse sense, means responsive to the said first pulses to increase charge on the said capacitor and means responsive to the said further pulses to decrease the charge on the said capacitor, whereby said capacitor stores a signal representative of an integration of the command signal, and a summing network for combining the stored representative signal with the steering signal to form the command signal.

2. A system as claimed in claim 1 in which the steering device is a rudder.

3. A system as claimed in claim 1 comprising also means for comparing signals representing a desired course and an actual course to obtain the said steering signal.

* * * * *